US011305502B2

(12) United States Patent
An

(10) Patent No.: US 11,305,502 B2
(45) Date of Patent: Apr. 19, 2022

(54) TIRE UNIFORMITY CORRECTING DRUM AND TIRE UNIFORMITY CORRECTING APPARATUS INCLUDING SAME

(71) Applicant: KUMHO TIRE CO., INC., Gwangju (KR)

(72) Inventor: Yeong Jun An, Gwangju (KR)

(73) Assignee: KUMHO TIRE CO., INC., Gwangju (KR)

( * ) Notice: Subject to any disclaimer, the term of this patent is extended or adjusted under 35 U.S.C. 154(b) by 279 days.

(21) Appl. No.: 16/523,109

(22) Filed: Jul. 26, 2019

(65) Prior Publication Data

US 2020/0079041 A1 Mar. 12, 2020

(30) Foreign Application Priority Data

Sep. 11, 2018 (KR) ........................ 10-2018-0108552

(51) Int. Cl.
*B29D 30/24* (2006.01)
*B29D 30/06* (2006.01)

(52) U.S. Cl.
CPC .... *B29D 30/244* (2013.01); *B29D 2030/0642* (2013.01)

(58) Field of Classification Search
CPC .... B29D 2030/0639; B29D 2030/0642; B29D 2030/0634; B29D 2030/0066; B29D 30/0633; B29D 2030/0641
See application file for complete search history.

(56) References Cited

U.S. PATENT DOCUMENTS 3,429,005 A * 2/1969 Macmillan ......... B29D 30/0603 425/47
3,976,532 A * 8/1976 Barefoot ................ B29D 30/56 156/406.2
4,568,259 A * 2/1986 Mattson ............ B29D 30/0606 425/40
6,689,304 B1 * 2/2004 Homt ................ B29D 30/0633 264/345

(Continued)

FOREIGN PATENT DOCUMENTS

CN 204842549 U 12/2015
CN 108248085 A 7/2018

OTHER PUBLICATIONS

ESpaceNet Translation of CN108248085 (Year: 2021).*
ESpaceNet Translation of CN204842549 (Year: 2021).*

*Primary Examiner* — Robert C Dye
*Assistant Examiner* — Alexander D Booth
(74) *Attorney, Agent, or Firm* — Saliwanchik, Lloyd & Eisenschenk

(57) ABSTRACT

A tire uniformity correcting drum comprises: a lower drum to be in contact with a portion of an inner circumferential surface of a tire; an upper drum provided to be movable up and down with respect to the lower drum and configured to press another portion of the inner circumferential surface of the tire which is not in contact with the lower drum; and a hydraulic driving unit configured to connect the lower drum and the upper drum and move up and down the upper drum with respect to the lower drum. A contact area of the upper drum with the inner circumferential surface of the tire is smaller than a contact area of the lower drum with the inner circumferential surface of the tire.

6 Claims, 4 Drawing Sheets

(56) References Cited

U.S. PATENT DOCUMENTS 6,916,164 B2 * 7/2005 Kasper ............... B29D 30/0606
425/46
2018/0024027 A1 * 1/2018 Okada ................ G01M 17/021
73/146

* cited by examiner

B - B'

TIRE UNIFORMITY CORRECTING DRUM AND TIRE UNIFORMITY CORRECTING APPARATUS INCLUDING SAME

CROSS-REFERENCE TO RELATED APPLICATION

This application is based on and claims priority from Korean Patent Application No. 10-2018-0108552, filed on Sep. 11, 2018, the disclosure of which is incorporated herein in its entirety by reference for all purposes.

FIELD OF THE INVENTION

The present disclosure relates to a tire uniformity correcting drum and a tire uniformity correcting apparatus including same.

BACKGROUND OF THE INVENTION

Generally, a pneumatic tire appears to have a uniform internal structure in a circumferential direction. However, the pneumatic tire has non-uniformity due to limitation in design and manufacturing processes. Thus, the uniformity of the tire indicates a degree of evenness of the tire and is used for determining a quality of the tire.

As for a method for determining uniformity of a tire, there are radial force variation (RFV) and lateral force variation (LFV) which indicate uniformity of hardness, static balance (S/B) and dynamic balance (D/B) which indicate uniformity of weight, and radial run out (RRO) and lateral run out (LRO) which indicate uniformity of dimension.

Among them, RFV indicates variation in radial force of the tire. When a load is applied to the tire while rotating the tire in a state where a tire shaft is fixed, vertical repulsive force between the tire and a drum is measured by installing a load cell at an upper and a lower end of a drum shaft for applying a load to the tire. At this time, the variation of the repulsive force during single rotation of the tire exhibits a regular wave. The RFV is a difference between a highest point and a lowest point of this wave. Although the RFV particularly affects steering stability, vibration, tread wear, or the like of a vehicle, the poor RFV of a finished product tire can be improved.

As for a conventional method for improving uniformity, there is a grinding method for improving RFV by grinding a shoulder portion of a tire corresponding to a peak point of a repulsive force in a radial direction of the tire with a grinder. However, the grinding method is disadvantageous in that an appearance of a tire deteriorates and a working environment becomes poor due to tire dust. In addition, an additional process for removing tire grinding powder is required and, thus, a cycle time in a tire manufacturing process increases.

Therefore, there is a demand for a tire uniformity correcting apparatus capable of efficiently improving the uniformity of the tire.

SUMMARY OF THE INVENTION

In view of the above, the present disclosure provides a tire uniformity correcting drum capable of improving uniformity of a tire, and a tire uniformity correcting apparatus including the same.

In accordance with an aspect, there is provided a tire uniformity correcting drum comprising: a lower drum to be in contact with a portion of an inner circumferential surface of a tire; an upper drum provided to be movable up and down with respect to the lower drum and configured to press another portion of the inner circumferential surface of the tire which is not in contact with the lower drum; and a hydraulic driving unit configured to connect the lower drum and the upper drum and move up and down the upper drum with respect to the lower drum, wherein a contact area of the upper drum with the inner circumferential surface of the tire is smaller than a contact area of the lower drum with the inner circumferential surface of the tire.

The upper drum may include: a drum body; a heater provided in the drum body to heat the drum body; and heat insulators provided at both end portions in a circumferential direction of the drum body.

Recess portions may be formed at both end portions in the circumferential direction of the drum body, and the heat insulators may be fitted in the recess portion and fixed to the drum body.

The tire uniformity correcting drum may further comprise: fastening members configured to fix the heat insulators to the drum body while penetrating through the heat insulators into the drum body.

Rounded portions may be provided at both ends in the circumferential direction of the upper drum.

In accordance with another aspect, there is provided a tire uniformity correcting apparatus comprising: a housing; the above-described tire uniformity correcting drum provided in the housing; a support configured to support the tire uniformity correcting drum; and a transfer unit slidably disposed at the housing, the transfer unit serving to transfer a tire to fix the tire to the tire uniformity correcting drum.

The support may project upward from a bottom surface of the housing and supports the tire uniformity correcting drum to be separated by a predetermined distance from the bottom surface of the housing.

The transfer unit may include: a transfer panel having a surface disposed to face a front surface of the tire uniformity correcting drum; a plurality of guide bars rotatably projecting from the surface of the transfer panel and configured to hold the tire; handles penetrating through the transfer panel and configured to fix the respective guide bars; and a guide rail coupled to the transfer panel and the housing and configured to guide movement of the transfer panel.

Effect of the Invention

The tire uniformity correcting drum and the tire uniformity correcting apparatus according to the embodiment of the present disclosure can easily improve the uniformity of the tire.

BRIEF DESCRIPTION OF THE DRAWINGS

The objects and features of the present disclosure will become apparent from the following description of embodiments, given in conjunction with the accompanying drawings, in which.

DETAILED DESCRIPTION OF THE EMBODIMENTS

Figure 1:
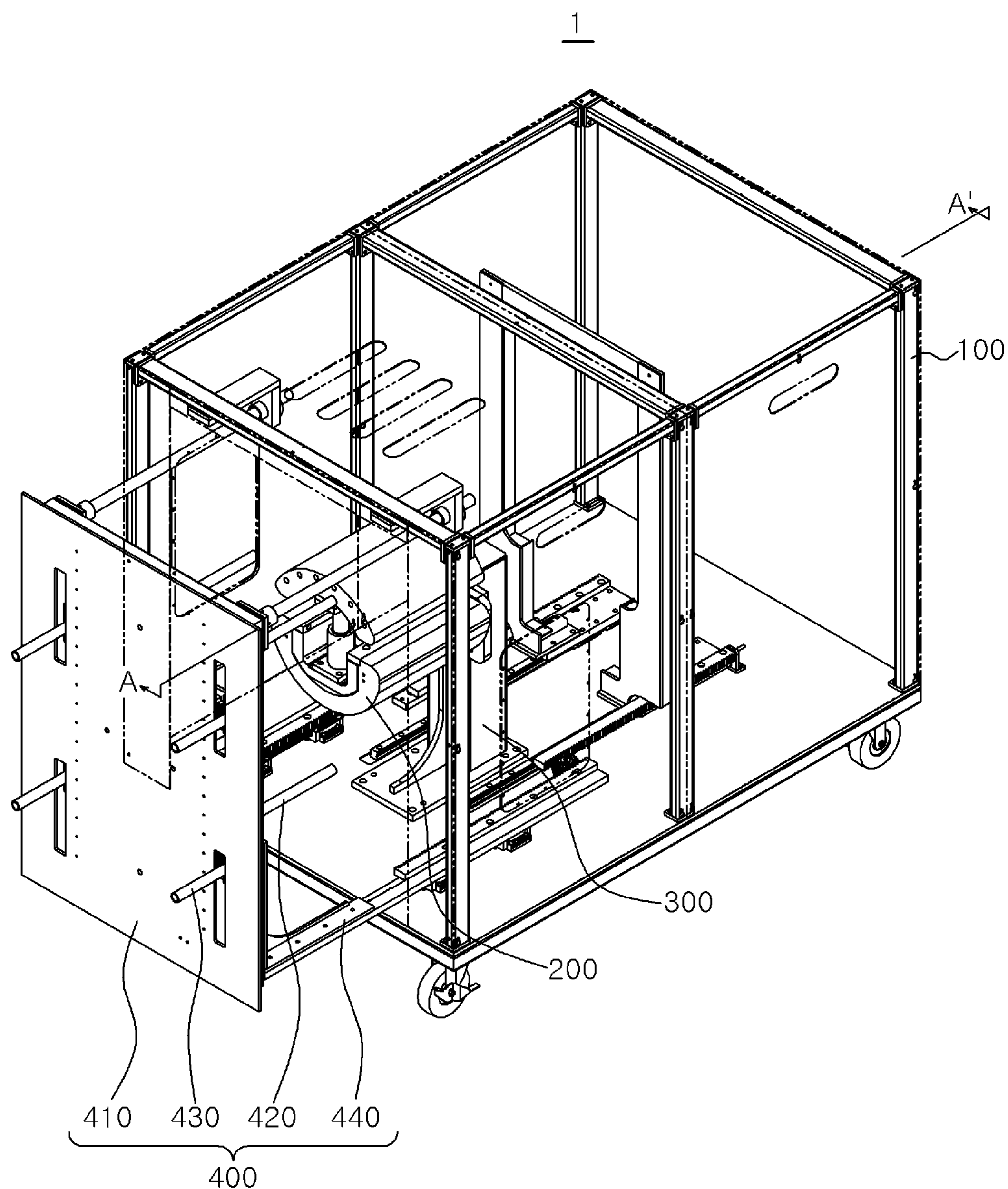
FIG. 1 is a schematic perspective view of a tire uniformity correcting apparatus according to an embodiment of the present disclosure.

First, it should be noted that terminologies or terms used throughout the present specification or claims should not be limited as their general or lexical definition, and may need to be understood by the definition and concepts corresponding to technical spirit of the disclosure based on a principle that the inventor may appropriately define the terms to descript the invention according to a best mode. Therefore, embodiments and drawings of the disclosure are only examples and thus may not fully represent the technical spirit of the disclosure. Accordingly, it may be understood that the scope of the disclosure may be defined by various equivalents and modifications.

Hereinafter, embodiments will be described in detail with reference to the accompanying drawings. Like reference numerals will be used for like parts throughout the drawings. Also, in describing the disclosure, if it is determined that a detailed description of related known components or functions unnecessarily obscures the gist of the present invention, the detailed description thereof will be omitted. For the same reason, some components are exaggerated, omitted or schematically illustrated in the accompanying drawings. The size of the respective components does not entirely reflect the actual size.

Further, in the present specification, the terms such as “upper”, “lower”, “side” and the like refer to directions in the drawings to which reference is made. Such terms can be differently expressed when a direction of a target is changed.

Figure 2:
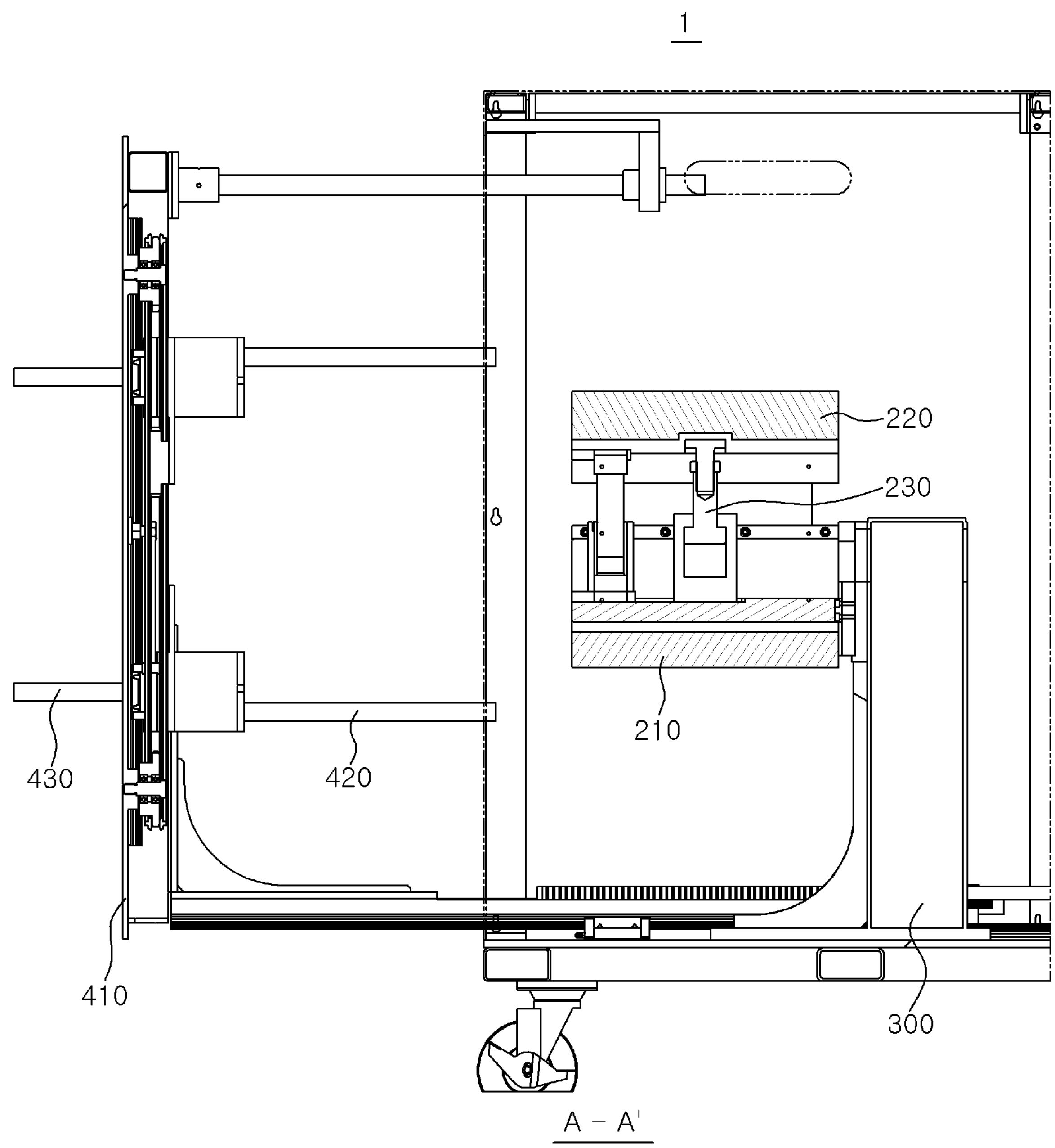
FIG. 2 is a schematic cross-sectional view taken along a line A-A' of FIG. 1.

FIG. 1 is a schematic perspective view of a tire uniformity correcting apparatus according to an embodiment of the present disclosure. FIG. 2 is a schematic cross-sectional view taken along a line A-A' of FIG. 1.

Referring to FIGS. 1 and 2, a tire uniformity correcting apparatus 1 according to an embodiment of the present disclosure includes: a housing 100, a tire uniformity correcting drum 200 disposed in the housing 100, a support 300 for supporting the tire uniformity correcting drum 200, and a transfer unit 400 slidably disposed at the housing 100 to transfer and fix the tire to the tire uniformity correcting drum.

The housing 100 can define an outer shape of a tire uniformity fixing device 1 and can be manufactured using a metal frame, for example. The housing 100 may have an inner space where the tire uniformity correcting drum 200 for improving the uniformity of the tire can be disposed.

The tire uniformity correcting drum 200 is brought into contact with an inner circumferential surface of the tire and applies heat and pressure to a peak point of the radial force variation (RFV) and therearound, thereby improving the uniformity of the tire. For example, the tire uniformity correcting drum 200 presses the tire with an upper drum 220 connected to a lower drum 210 which comes in contact with a portion of the inner circumferential surface of the tire, to be movable up and down with respect to the lower drum 210, thereby improving the uniformity of the tire. This will be described in detail later.

The support 300 may be disposed in the housing 100. The support 300 may protrude upward from a bottom surface of the housing 100 to support the tire uniformity correcting drum 200 to be separated by a predetermined distance from the bottom surface of the housing 100.

The transfer unit 400 may be provided to fix the tire to the tire uniformity correcting drum 200. The transfer unit 400 can slide to and from the housing 100 to attach/detach the tire to/from the tire uniformity correcting drum 200. The transfer unit 400 may include, e.g., a transfer panel having a surface disposed to face a front surface of the tire uniformity correcting drum 200, a plurality of guide bars 420 rotatably projecting from the surface of the transfer panel 410 and configured to hold a tire, handles 430 penetrating through the transfer panel 410 and configured to fix the respective guide bars, and a guide rail 440 coupled to the transfer panel 410 and the housing 100 to guide the movement of the transfer panel 410.

The process in which the tire is attached to the tire uniformity correcting drum 200 by the transfer unit 400 will be described. First, the tire can be held by the guide bars 420 by bring the outer circumferential surface of the tire into contact with the guide bars 420. Next, the tire can be rotated so that a correction target position, i.e., the RFV peak point, of the tire can be located at the 12 o'clock position when the transfer panel 410 is viewed from the front side. Here, the tire can be rotated by the rotation of the guide bars 420. If the RFV peak point is located at the 12 o'clock position, the guide bars 420 and the tire can be fixed by the handles 430. Then, the transfer panel 410 is slid along the guide rail 440 to the housing 100 side, and the tire uniformity correcting drum 200 can be brought into contact with the inner circumferential surface of the tire. The tire can be attached to the tire uniformity correcting drum 200 through the above-described processes. Hereinafter, the configuration of the tire uniformity correcting drum 200 according to the embodiment of the present disclosure will be described in detail with reference to FIGS. 3 and 4.

Figure 3:
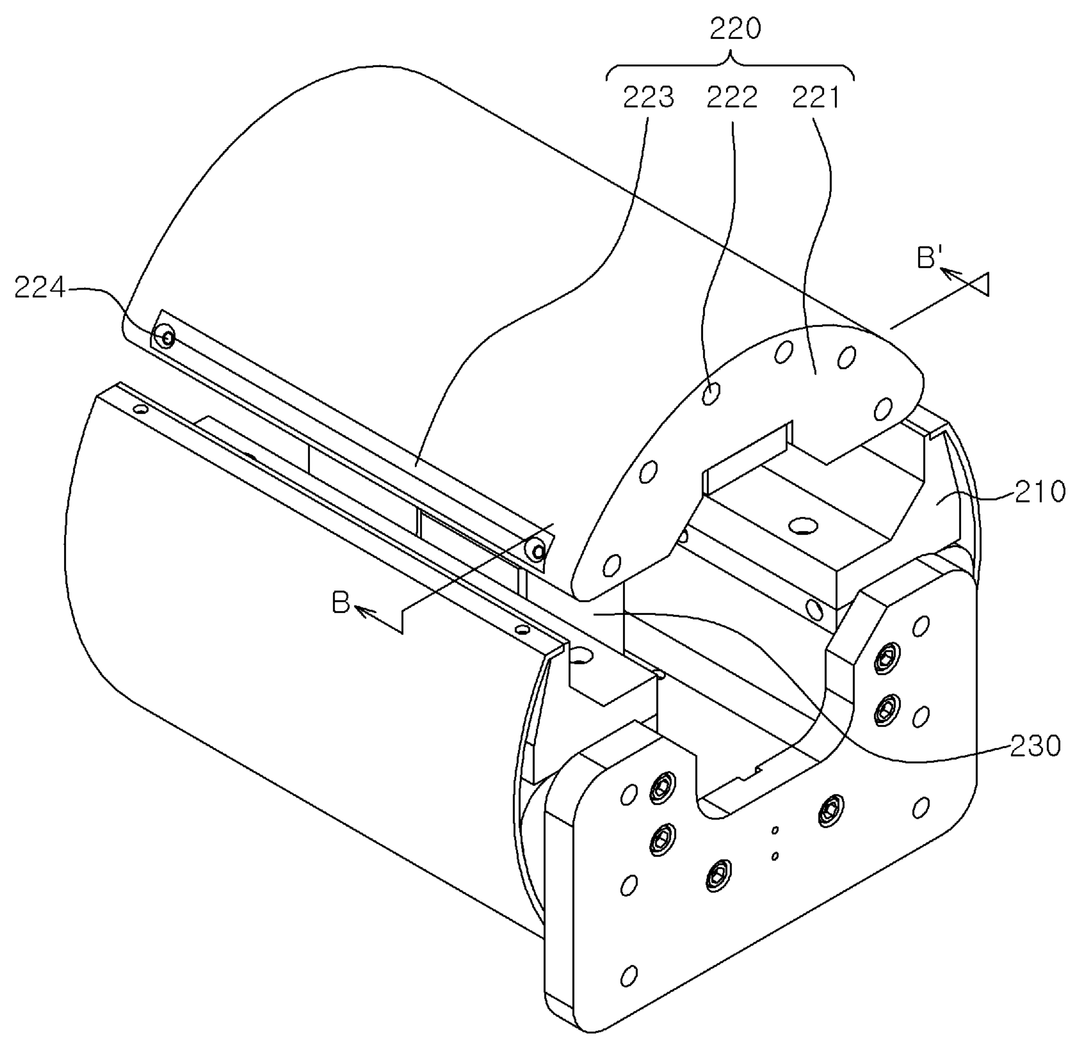
FIG. 3 is a schematic perspective view of a tire uniformity correcting drum according to an embodiment of the present disclosure.
Figure 4:
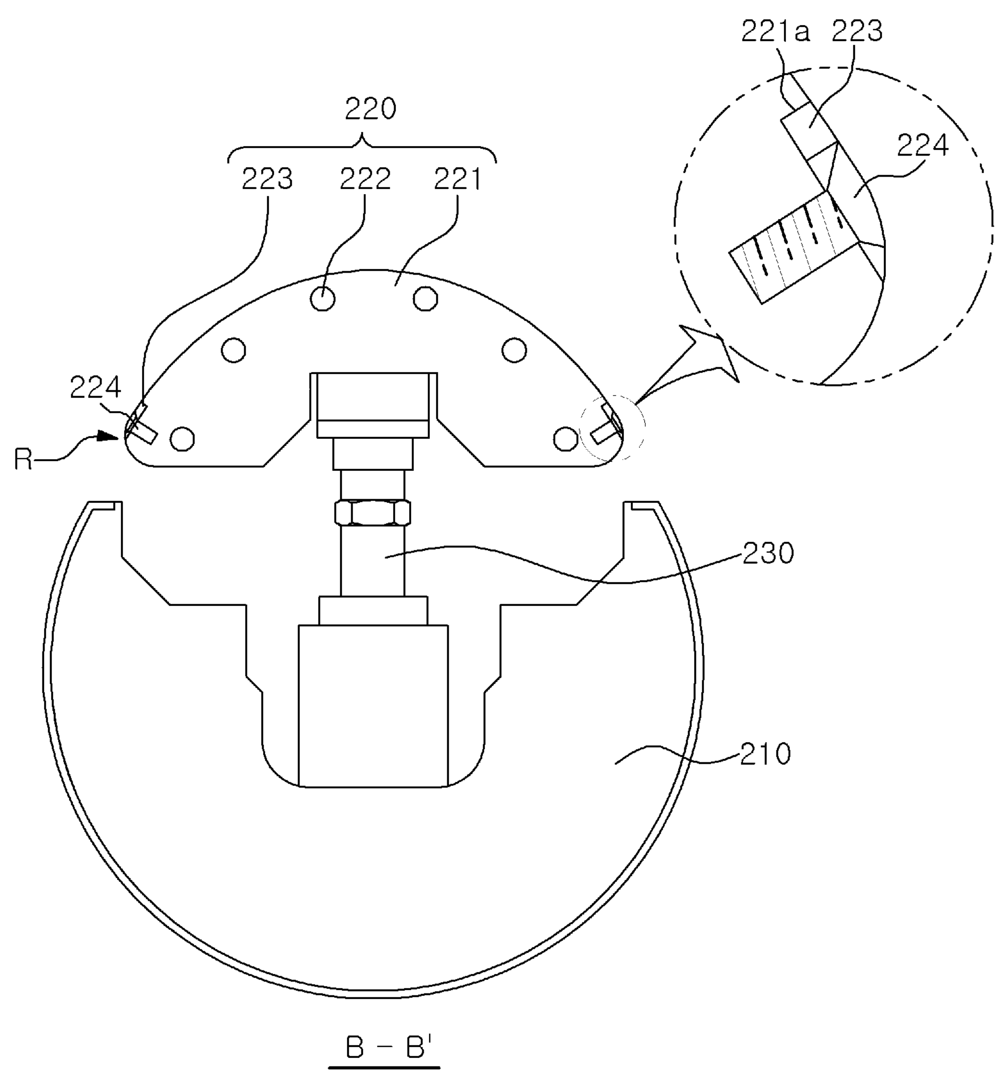
FIG. 4 is a schematic cross-sectional view taken along a line B-B' of FIG. 3.

FIG. 3 is a schematic perspective view of a tire uniformity correcting drum according to an embodiment of the present disclosure. FIG. 4 is a schematic cross-sectional view taken along a line B-B' of FIG. 3.

Referring to FIGS. 3 and 4, the tire uniformity correcting drum 200 according to the embodiment of the present disclosure is provided to improve the uniformity of the tire by applying heat and pressure to the inner circumferential surface of the tire. For example, the tire uniformity correcting drum 200 may include the lower drum 210 to be in contact with a portion of the inner circumferential surface of the tire, the upper drum 220 provided to be movable up and down with respect to the lower drum 210 and configured to press another portion of the inner circumferential surface of the tire which is not in contact with the lower drum 210, and a hydraulic driving unit 230 configured to connect the lower drum 210 and the upper drum 220 and move up and down the upper drum 220 with respect to the lower drum 210.

The lower drum 210 can be made of metal and fixed to the support 300. The outer surface of the lower drum 210 may be curved to correspond to the inner circumferential surface of the tire. For example, the lower drum 210 may be formed in a horizontally extending cylindrical shape with an upper opening.

The hydraulic driving unit 230 may be provided in the lower drum 210. The hydraulic driving unit 230 can connect the lower drum 210 and the upper drum 220. When the hydraulic driving unit 230 is driven, the upper drum 220 can be moved up and down. The hydraulic driving unit 230 may be, e.g., a hydraulic cylinder. The driving of the hydraulic driving unit 230 can be controlled by a controller (not shown). The controller may include an operation unit including one or more microprocessors, a memory, a communication unit and the like. The configuration of the controller is well known in the art and the detailed description thereof will be omitted.

When the tire is attached to the tire uniformity correcting drum 200, the lower drum 210 can be in contact with a portion of the inner circumferential surface of the tire, i.e., a lower portion of the inner circumferential surface of the tire.

The upper drum 220, which is heated, may press another portion of the inner circumferential surface of the tire, i.e., an upper portion of the inner circumferential surface of the tire to improve the uniformity of the tire. The upper drum 220 can be made of metal and may include, e.g., a drum body 221 that defines an outer shape of the upper drum 220, a heater 222 disposed in the drum body 221 to heat the drum body 221, and heat insulators 223 provided at both end portions in the circumferential direction of the drum body. Here, the circumferential direction may indicate a direction extending along the outer circumferential surface of the tire uniformity correcting drum in FIG. 3.

The drum body 221 can form the outer shape of the upper drum 220. The drum body 221 is connected to the hydraulic driving unit 230 and disposed at the upper side of the lower drum 210 which is cut and opened. The outer circumferential surface of the drum body 221 may be curved to correspond to the inner circumferential surface of the tire. Therefore, the combination of the upper drum 220 and the lower drum 210 may have a horizontally extending cylindrical shape. When the upper drum 220 is moved up by the hydraulic driving unit 230, the upper surface of the drum body 221 can be brought into contact with the inner circumferential surface of the tire and press the tire. Accordingly, the uniformity of the tire can be improved. More specifically, when the heated drum body 221 presses the inner circumferential surface of the tire, plastic deformation occurs at the rim on the tire bead side. By plastically deforming the rim on the tire bead side with the drum body 221, the uniformity of the tire can be improved.

One or more heaters 222 for heating the drum body 221 may be provided in the drum body 221. The drum body 221 can be heated by the heaters 222. Therefore, when the drum body 221 presses the inner circumferential surface of the tire, the inner circumferential surface of the tire can be plastically deformed by the heated drum body 221. Accordingly, the uniformity of the tire can be improved.

A rounded portion R may be provided at both ends in the circumferential direction of the drum body 221. By providing the rounded portions R at the drum body 221, it is possible to prevent the tire uniformity correcting drum 200 according to an embodiment of the present disclosure from damaging the tire during the tire uniformity correcting process. In other words, when the upper drum 220 is moved up and presses the inner circumferential surface of the tire, the stress may be concentrated at the portions of the inner circumferential surface of the tire with which the end portions of the upper drum 220 and the lower drum 210 in the circumferential direction come into contact. The concentration of the stress on the inner circumferential surface of the tire may be decreased by providing the rounded portions R at both ends in the circumferential direction of the drum body 221.

In addition, the heat insulators 223 may be disposed at both end portions in the circumferential direction of the drum body 221 along the edge. For example, recess portions 221*a* may be formed at both end portions in the circumferential direction of the drum body 221, the recess portions 221*a* extending in a width direction along the edge of the drum body 221, and the heat insulators 223 may be fitted in the recess portions 221*a* and fixed to the drum body 221 through, e.g., fastening members 224 penetrating through the heat insulators 223 into the drum body 221. The heat insulators 223 may be formed of, e.g., a PEEK (polyether ether ketone) material. By providing the heat insulators 223, it is possible to prevent excessive deformation of the inner circumferential surface of the tire that is brought into contact with both end portions of the drum body 221.

The upper drum 220 may have a relatively small circumferential surface compared to that of the lower drum 210. Specifically, the contact area of the upper drum 220 that is brought into contact with the inner circumferential surface of the tire may be smaller than the contact area of the lower drum 210 that is brought into contact with the inner circumferential surface of the tire. Therefore, with the tire uniformity correcting drum 200 according to the embodiment of the present disclosure, the application of heat and pressure can be concentrated to a portion of the tire where plastic deformation is required. Accordingly, the uniformity of the tire can be improved.

While the present disclosure has been shown and described with respect to the embodiments, it will be understood by those skilled in the art that various changes and modifications may be made without departing from the scope of the present disclosure as defined in the following claims.

What is claimed is:

1. A tire uniformity correcting drum comprising:

a lower drum to be in contact with a portion of an inner circumferential surface of a tire;

an upper drum provided to be movable up and down with respect to the lower drum and configured to press another portion of the inner circumferential surface of the tire which is not in contact with the lower drum; and a hydraulic driving unit configured to connect the lower drum and the upper drum and move up and down the upper drum with respect to the lower drum, wherein a contact area of the upper drum with the inner circumferential surface of the tire is smaller than a contact area of the lower drum with the inner circumferential surface of the tire, wherein the upper drum includes: a drum body; and first and second heat insulators respectively provided at first and second end portions in a circumferential direction of the drum body, wherein first and second recess portions recessed in the drum body are respectively disposed at the first and second end portions in the circumferential direction of the drum body, and the first and second heat insulators are respectively fitted in the first and second recess portions and fixed to the drum body, wherein first and second rounded portions are respectively provided at first and second ends in the circumferential direction of the upper drum, and wherein the first rounded portion is formed by the first end portion and an outer surface of the first heat insulator, and the second rounded portion is formed by the second end portion and an outer surface of the second heat insulator.

2. The tire uniformity correcting drum of claim 1, wherein the upper drum further includes a heater provided in the drum body to heat the drum body.

3. The tire uniformity correcting drum of claim 1, further comprising:

first and second fastening members configured to respectively fix the first and second heat insulators to the drum body while respectively penetrating through the first and second heat insulators into the drum body.

4. A tire uniformity correcting apparatus comprising:

a housing;

the tire uniformity correcting drum, described in claim 1, provided in the housing;

a support configured to support the tire uniformity correcting drum; and a transfer unit slidably disposed at the housing, the transfer unit serving to transfer a tire to fix the tire to the tire uniformity correcting drum.

5. The tire uniformity correcting apparatus of claim 4, wherein the support projects upward from a bottom surface of the housing and supports the tire uniformity correcting drum to be separated by a predetermined distance from the bottom surface of the housing.

6. The tire uniformity correcting apparatus of claim 4, wherein the transfer unit includes:

a transfer panel having a surface disposed to face a front surface of the tire uniformity correcting drum;

a plurality of guide bars rotatably projecting from the surface of the transfer panel and configured to hold the tire;

handles penetrating through the transfer panel and configured to fix the respective guide bars; and a guide rail coupled to the transfer panel and the housing and configured to guide movement of the transfer panel.

* * * * *